United States Patent
Kalra et al.

(10) Patent No.: US 10,819,727 B2
(45) Date of Patent: Oct. 27, 2020

(54) DETECTING AND DETERRING NETWORK ATTACKS

(71) Applicant: Schweitzer Engineering Laboratories, Inc., Pullman, WA (US)

(72) Inventors: Amandeep Singh Kalra, Mill Creek, WA (US); David J. Dolezilek, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 138 days.

(21) Appl. No.: 16/159,925

(22) Filed: Oct. 15, 2018

(65) Prior Publication Data

US 2020/0120119 A1    Apr. 16, 2020

(51) Int. Cl.
*H04L 29/06* (2006.01)
*H04L 12/947* (2013.01)
*H04L 12/26* (2006.01)

(52) U.S. Cl.
CPC ........ *H04L 63/1425* (2013.01); *H04L 43/106* (2013.01); *H04L 49/25* (2013.01); *H04L 63/1416* (2013.01)

(58) Field of Classification Search
CPC . H04L 63/1425; H04L 63/1416; H04L 49/25; H04L 43/106
See application file for complete search history.

(56) References Cited

U.S. PATENT DOCUMENTS

| | | |
|---|---|---|
| 4,054,949 A | 10/1977 | Takezoe |
| 4,535,306 A | 8/1985 | Yamaguchi |
| 4,546,486 A | 10/1985 | Evans |
| 4,768,178 A | 8/1988 | Conklin |
| 4,808,884 A | 2/1989 | Hull |
| 5,103,466 A | 4/1992 | Bazes |
| 5,160,926 A | 11/1992 | Schweitzer, III |

(Continued)

FOREIGN PATENT DOCUMENTS

| | | |
|---|---|---|
| GB | 2278519 | 11/1994 |
| JP | 10247377 | 9/1998 |

(Continued)

OTHER PUBLICATIONS

Roy Moxley, Ken Fodero, and Hector J. Altuve, Updated Transmission Line Protection Communications, IEEE, Oct. 2008.

(Continued)

*Primary Examiner* — Christopher C Harris
(74) *Attorney, Agent, or Firm* — Jared L. Cherry

(57) ABSTRACT

The present disclosure pertains to detecting a network attack. In one embodiment, a first device may receive a high-precision time signal and may use the signal to associate a first time stamp with each of a plurality of data packets reflecting a time that each data packet is transmitted. A second device may receive the plurality of data packets from the first device via a data network. The second device may also receive the high-precision time signal and may use the signal to associate a second time stamp with each of the plurality of data packets reflecting a time that each data packet is received. A time of flight may be determined based on the first time stamp and the second time stamp. The second device may determine whether the time of flight for each of the first plurality of data packets is consistent with a valid time of flight.

19 Claims, 7 Drawing Sheets

(56) References Cited

U.S. PATENT DOCUMENTS

| | | |
|---|---|---|
| 5,235,590 A | 8/1993 | Taguchi |
| 5,363,377 A | 11/1994 | Sharpe |
| 5,557,284 A | 9/1996 | Hartman |
| 5,596,263 A | 1/1997 | Zavis |
| 5,630,757 A | 5/1997 | Gagin |
| 5,699,367 A | 12/1997 | Haartsen |
| 5,737,715 A | 4/1998 | Deaton |
| 5,793,869 A | 8/1998 | Claflin |
| 6,144,334 A | 11/2000 | Claffey |
| 6,229,479 B1 | 5/2001 | Kozlov |
| 6,456,831 B1 | 9/2002 | Tada |
| 6,483,856 B1 | 11/2002 | Bird |
| 6,535,925 B1 | 3/2003 | Svanbro |
| 6,577,628 B1 | 6/2003 | Hejza |
| 6,608,841 B1 | 8/2003 | Koodli |
| 6,678,134 B2 | 1/2004 | Sugiura |
| 6,751,209 B1 | 6/2004 | Hamiti |
| 6,754,210 B1 | 6/2004 | Ofek |
| 6,847,691 B2 | 1/2005 | Torikoshi |
| 6,859,742 B2 | 2/2005 | Randall |
| 6,891,441 B2 | 5/2005 | Rochow |
| 6,937,683 B1 | 8/2005 | Ratzel |
| 6,947,269 B2 | 9/2005 | Lee |
| 6,973,085 B1 | 12/2005 | Acharya |
| 7,095,855 B1* | 8/2006 | Collins ............... H04L 9/0637 |
| | | 380/241 |
| 7,146,516 B2 | 12/2006 | Dhupar |
| 7,239,581 B2 | 7/2007 | Delgado |
| 7,251,570 B2 | 7/2007 | Hancock |
| 7,272,201 B2 | 9/2007 | Whitehead |
| 7,283,568 B2 | 10/2007 | Robie |
| 7,375,683 B2 | 5/2008 | Smith |
| 7,398,411 B2 | 7/2008 | Zweigle |
| 7,436,232 B2 | 10/2008 | Sivero |
| 7,440,427 B1 | 10/2008 | Katz |
| 7,463,467 B2 | 12/2008 | Lee |
| 7,571,216 B1 | 8/2009 | Mcrae |
| 7,606,541 B1 | 10/2009 | Nicholls |
| 7,617,408 B2 | 11/2009 | Frazier |
| 7,664,869 B2 | 2/2010 | Baker |
| 7,701,683 B2 | 4/2010 | Morris |
| 7,940,213 B2 | 5/2011 | Harper |
| 7,952,519 B1 | 5/2011 | Nielsen |
| 7,978,130 B1 | 7/2011 | Cohen |
| 7,979,228 B2 | 7/2011 | Zurbuchen |
| 8,055,288 B2 | 11/2011 | Ladd |
| 8,082,367 B2 | 12/2011 | Etheridge |
| 8,138,972 B2 | 3/2012 | Underbrink |
| 8,159,391 B2 | 4/2012 | Papadimitratos |
| 8,237,609 B2 | 8/2012 | Talbot |
| 8,325,087 B2 | 12/2012 | Thomson |
| 8,326,319 B2 | 12/2012 | Davis |
| 8,351,433 B2 | 1/2013 | Morris |
| 8,446,896 B2 | 5/2013 | Bedrosian |
| 8,564,330 B1 | 10/2013 | Radulov |
| 8,578,012 B2 | 11/2013 | Bradetich |
| 8,655,608 B2 | 2/2014 | Guzman-Casillas |
| 8,793,767 B2 | 7/2014 | Schweitzer |
| 8,819,512 B1 | 8/2014 | Wang |
| 8,867,520 B2 | 10/2014 | Nicholls |
| 9,065,763 B2 | 6/2015 | Kasztenny |
| 9,083,503 B2 | 7/2015 | Sagen |
| 9,270,109 B2 | 2/2016 | Dolezilek |
| 9,270,442 B2 | 2/2016 | Rice |
| 9,300,591 B2 | 3/2016 | Rajasekaran |
| 9,319,100 B2 | 4/2016 | Achanta |
| 9,400,330 B2 | 7/2016 | Achanta |
| 9,520,860 B2 | 12/2016 | Whitehead |
| 9,599,719 B2 | 3/2017 | Achanta |
| 9,709,682 B2 | 7/2017 | Achanta |
| 9,759,816 B2 | 9/2017 | Achanta |
| 9,774,401 B1 | 9/2017 | Borrill |
| 9,996,105 B1* | 6/2018 | Paul ................... H04L 43/106 |
| 2001/0023464 A1 | 9/2001 | Deck |
| 2002/0033767 A1 | 3/2002 | Krasner |
| 2002/0069299 A1 | 6/2002 | Rosener |
| 2002/0080808 A1 | 6/2002 | Leung |
| 2002/0095601 A1* | 7/2002 | Hind ..................... H04L 9/3273 |
| | | 726/22 |
| 2002/0136172 A1 | 9/2002 | Chun |
| 2002/0158693 A1 | 10/2002 | Soong |
| 2002/0167934 A1 | 11/2002 | Carter |
| 2003/0004689 A1 | 1/2003 | Gupta |
| 2003/0087654 A1 | 5/2003 | Wheeler |
| 2003/0107513 A1 | 6/2003 | Abraham |
| 2003/0195975 A1 | 10/2003 | Papadopoulos |
| 2003/0204756 A1 | 10/2003 | Ransom |
| 2004/0062279 A1 | 4/2004 | Primrose |
| 2004/0138786 A1 | 7/2004 | Blackett |
| 2004/0138834 A1 | 7/2004 | Blackett |
| 2004/0148552 A1 | 7/2004 | Matsumoto |
| 2004/0166879 A1 | 8/2004 | Meadows |
| 2004/0196855 A1 | 10/2004 | Davies |
| 2004/0213214 A1 | 10/2004 | Jung |
| 2004/0228368 A1 | 11/2004 | Jecmen |
| 2005/0025105 A1 | 2/2005 | Rue |
| 2005/0085279 A1 | 4/2005 | Aoki |
| 2005/0114023 A1 | 5/2005 | Williamson |
| 2005/0160184 A1 | 7/2005 | Walsh |
| 2006/0029105 A1 | 2/2006 | Kasztenny |
| 2006/0123119 A1 | 6/2006 | Hill |
| 2006/0239218 A1* | 10/2006 | Weis ..................... H04L 63/1458 |
| | | 370/312 |
| 2006/0259806 A1 | 11/2006 | Zweigle |
| 2007/0002746 A1 | 1/2007 | Shankar |
| 2007/0058320 A1 | 3/2007 | Lee |
| 2007/0067625 A1 | 3/2007 | Jiang |
| 2007/0096942 A1 | 5/2007 | Kagan |
| 2007/0127487 A1 | 6/2007 | Kim |
| 2007/0132773 A1 | 6/2007 | Plante |
| 2007/0147415 A1 | 6/2007 | Marusca |
| 2007/0194987 A1 | 8/2007 | Fedora |
| 2007/0252724 A1 | 11/2007 | Donaghey |
| 2007/0291780 A1 | 12/2007 | Smith |
| 2008/0005484 A1 | 1/2008 | Joshi |
| 2008/0062039 A1 | 3/2008 | Cohen |
| 2008/0068291 A1 | 3/2008 | Yuan |
| 2008/0071482 A1 | 3/2008 | Zweigle |
| 2008/0101251 A1 | 5/2008 | Casebolt |
| 2008/0127210 A1 | 5/2008 | Bosold |
| 2008/0150753 A1 | 6/2008 | Rudolf |
| 2008/0169978 A1 | 7/2008 | Powell |
| 2008/0186229 A1 | 8/2008 | Van Diggelen |
| 2008/0188264 A1 | 8/2008 | Duan |
| 2008/0189784 A1 | 8/2008 | Mangione-Smith |
| 2008/0192635 A1 | 8/2008 | Usuda |
| 2008/0198069 A1 | 8/2008 | Gronemeyer |
| 2008/0219186 A1 | 9/2008 | Bell |
| 2008/0235355 A1 | 9/2008 | Spanier |
| 2008/0260151 A1* | 10/2008 | Fluhrer .................. H04L 69/28 |
| | | 380/255 |
| 2009/0052392 A1 | 2/2009 | Sumasu |
| 2009/0070447 A1 | 3/2009 | Jubinville |
| 2009/0117928 A1 | 5/2009 | Ladd |
| 2009/0141727 A1 | 6/2009 | Brown |
| 2009/0160189 A1 | 6/2009 | Rasmussen |
| 2009/0160705 A1 | 6/2009 | Matsuzaki |
| 2009/0180477 A1 | 7/2009 | Akahane |
| 2009/0254655 A1 | 10/2009 | Kidwell |
| 2009/0260083 A1 | 10/2009 | Szeto |
| 2009/0262016 A1 | 10/2009 | Wirola |
| 2009/0300165 A1 | 12/2009 | Tuckey |
| 2009/0315764 A1 | 12/2009 | Cohen |
| 2009/0319904 A1 | 12/2009 | Rensin |
| 2010/0020773 A1 | 1/2010 | Jechoux |
| 2010/0030916 A1 | 2/2010 | Greenwood Graham |
| 2010/0034190 A1 | 2/2010 | Yun |
| 2010/0054164 A1 | 3/2010 | Lucani |
| 2010/0073228 A1 | 3/2010 | Smith |
| 2010/0104044 A1 | 4/2010 | Kishigami |
| 2010/0117899 A1 | 5/2010 | Papadimitratos |
| 2010/0127928 A1 | 5/2010 | Thomson |
| 2010/0142560 A1 | 6/2010 | Sharivker |
| 2010/0182952 A1 | 7/2010 | Jeong |

(56) References Cited

U.S. PATENT DOCUMENTS

| | | |
|---|---|---|
| 2010/0190509 A1 | 7/2010 | Davis |
| 2010/0195763 A1 | 8/2010 | Lee |
| 2010/0215004 A1 | 8/2010 | Yoo |
| 2010/0222068 A1 | 9/2010 | Gaal |
| 2010/0231445 A1 | 9/2010 | Tarlow |
| 2010/0231448 A1 | 9/2010 | Harper |
| 2010/0251134 A1 | 9/2010 | Van Seggelen |
| 2010/0253578 A1 | 10/2010 | Mantovani |
| 2010/0254225 A1 | 10/2010 | Schweitzer, III |
| 2010/0275086 A1 | 10/2010 | Bergquist |
| 2010/0306533 A1 | 12/2010 | Phatak |
| 2011/0001668 A1 | 1/2011 | Cobb |
| 2011/0022666 A1 | 1/2011 | Pinto |
| 2011/0035066 A1 | 2/2011 | Schweitzer |
| 2011/0063767 A1 | 3/2011 | Kasztenny |
| 2011/0068973 A1 | 3/2011 | Humphreys |
| 2011/0069709 A1 | 3/2011 | Morris |
| 2011/0069718 A1 | 3/2011 | Morris |
| 2011/0085540 A1 | 4/2011 | Kuwabara |
| 2011/0088096 A1 | 4/2011 | Hilton |
| 2011/0102258 A1 | 5/2011 | Underbrink |
| 2011/0102259 A1 | 5/2011 | Ledvina |
| 2011/0169577 A1 | 7/2011 | Nicholls |
| 2011/0181466 A1 | 7/2011 | Serrano |
| 2011/0227787 A1 | 9/2011 | Gum |
| 2011/0261917 A1 | 10/2011 | Bedrosian |
| 2011/0285586 A1 | 11/2011 | Ferguson |
| 2011/0287779 A1 | 11/2011 | Harper |
| 2012/0005326 A1 | 1/2012 | Bradetich |
| 2012/0026037 A1 | 2/2012 | Thomson |
| 2012/0030495 A1 | 2/2012 | Chandhoke |
| 2012/0066418 A1 | 3/2012 | Foster |
| 2012/0078555 A1 | 3/2012 | Banhegyesi |
| 2012/0082048 A1 | 4/2012 | Taft |
| 2012/0116677 A1 | 5/2012 | Higgison |
| 2012/0155458 A1 | 6/2012 | Larson |
| 2012/0179404 A1 | 7/2012 | Lee |
| 2012/0182181 A1 | 7/2012 | Dai |
| 2012/0195253 A1 | 8/2012 | Irvine |
| 2012/0195309 A1 | 8/2012 | Okuda |
| 2012/0195350 A1 | 8/2012 | Das |
| 2012/0215479 A1 | 8/2012 | Pamulaparthy |
| 2012/0278421 A1 | 11/2012 | Sun |
| 2012/0323397 A1 | 12/2012 | Schweitzer, III |
| 2013/0018521 A1 | 1/2013 | Manson |
| 2013/0039266 A1 | 2/2013 | Ekici |
| 2013/0091258 A1 | 4/2013 | Shaffer |
| 2013/0117755 A1 | 5/2013 | Bontempi |
| 2013/0142336 A1 | 6/2013 | Fries |
| 2013/0157593 A1 | 6/2013 | Achanta |
| 2013/0244624 A1 | 9/2013 | Das |
| 2013/0328606 A1 | 12/2013 | Ravi |
| 2013/0335266 A1 | 12/2013 | Vollath |
| 2014/0003199 A1 | 1/2014 | Dougan |
| 2014/0025321 A1 | 1/2014 | Spanier |
| 2014/0068711 A1 | 3/2014 | Schweitzer |
| 2014/0094218 A1 | 4/2014 | Hammes |
| 2014/0100702 A1 | 4/2014 | Schweitzer |
| 2014/0114608 A1 | 4/2014 | Achanta |
| 2014/0195844 A1 | 7/2014 | Laval |
| 2014/0232595 A1 | 8/2014 | Rife |
| 2014/0250972 A1 | 9/2014 | Achanta |
| 2014/0269736 A1 | 9/2014 | Kasztenny |
| 2014/0280712 A1 | 9/2014 | Dolezilek |
| 2014/0327574 A1 | 11/2014 | Achanta |
| 2014/0334477 A1 | 11/2014 | Stahlin |
| 2015/0043697 A1 | 2/2015 | Achanta |
| 2015/0081235 A1 | 3/2015 | Schweitzer |
| 2015/0081887 A1 | 3/2015 | Kalkunte |
| 2015/0312023 A1 | 10/2015 | Rice |
| 2015/0331052 A1 | 11/2015 | Seeley |
| 2015/0364953 A1 | 12/2015 | Rippon |
| 2016/0344729 A1 | 11/2016 | Slaight |
| 2016/0359872 A1 | 12/2016 | Yadav et al. |
| 2017/0026144 A1* | 1/2017 | Zinner ............... H04L 63/1441 |
| 2017/0188192 A1* | 6/2017 | Mujtaba ............... H04W 4/023 |
| 2017/0195362 A1 | 7/2017 | Schweitzer |
| 2018/0234797 A1* | 8/2018 | Ledvina ............... H04W 4/023 |
| 2018/0292522 A1 | 10/2018 | Cavendish et al. |

FOREIGN PATENT DOCUMENTS

| | | |
|---|---|---|
| JP | 2001221871 | 8/2001 |
| JP | 2001221874 | 8/2001 |
| WO | 9747987 | 12/1997 |
| WO | 0057527 | 9/2000 |
| WO | 0016525 | 3/2001 |
| WO | 2005088911 | 9/2005 |
| WO | 2012151006 | 11/2012 |
| WO | 2014005016 | 1/2014 |

OTHER PUBLICATIONS

James W. Rice, Sam Fulford, and Nicholas C. Seeley, Improved Service Reliability for Rural Electric Customers—Innovative Auto-Restoration Following Loss of Primary Source Interconnection, Sep. 2006.

Nicholas C. Seeley, Automation at Protection Speeds: IEC 61850 GOOSE Messaging as a Reliable, High-Speed Alternative to Serial Communications, Feb. 2008.

S. Ward, W. Higinbotham, E. Duvelson, Inside the Cloud—Network Communications Basics for the Relay Engineer, 34th Annual Western Protective Relay Conference, Oct. 2007.

D.L. Mills, Experiments in Network Clock Synchronization, Network Working Group Request for Comments: 957, Sep. 1985.

D. Mills, Simple Network Time Protocol (SNTP) Version 4 for IPv4, IPv6, and OSI, Network Working Group Request for Comments: 4330, Jan. 2006.

Daqing Hou, Dave Dolezilek, IEC 61850—What It Can and Cannot Offer to Traditional Protection Schemes, Sep. 2008.

W. Kleinebreg, ABB Switzerland Ltd., Hirschmann Automation & Control GmbH, IEC 61850 Modeling of Switches, Dec. 2009.

Fateri, Sina, et al. "Design and Analysis of Multicast-Based Publisher/Subscriber Models over Wireless Platforms for Smart Grid Communications." Trust, Security and Privacy in Computing and Communications (TrustCom), 2012 IEEE 11th International Conference on. IEEE, 2012.

Maheswaran, O., A. Kavitha Lakshmi, and R. Malarvizhi. "Guidelines for specification and evaluation of substation automation projects based on IEC 61850." CIGRE India Journal 1.1 (2012): 30-35.

Brantley, Robert, Jacobus Theron, and Eric Udren. "The Application of IEC® 61850 to Replace Auxilliary Devices Including Lockout Relays." 60th Annual Georgia Tech Protective Relaying Conference May 2006.

Xyngi., and M. Popov. "IEC61850 overview—where protection meets communication." (2010): 46-46.

Smith, T., J. Vico , and Craig Wester. "Advanced distribution reclosing using wireless communications." Rural Electric Power Conference (REPC), 2011 IEEE. IEEE, 2011.

Ozansoy, Cagil R., Aladin Zayegh, and Akhtar Kalam. "The real-time publisher/subscriber communication model for distributed substation sustems. "Power Delivery, IEEE Transactions on 22.3 (2007): 1411-1423.

Bill Lichtensteiger, Branko Bjelajac, Christian Muller, Christian Wietfeld. "RF Mesh Systems for Smart Metering: System Architecture and Performance", Smart Grid Communications, IEEE, Oct. 2010.

Tippenhauer, N. O., Popper, C., Rasmussen, K.B., Capkun, S., On the Requirements for Successful GPS Spoofing Attacks, In Proceedings of the ACM Conference on Computer and Communications Security (CCS), Oct. 2011.

Moore, P., Crossley, P., GPS Applications in Power Systems Part 1 Introduction to GPS, Tutorial: GPS in Power Systems, Power Engineering Journal, Feb. 1999.

Jafamia-Jahromi, A., Broumandan, A., Nielsen, J., Lachapelle, G., "GPS Vulnerability to Spoofing Threats and a Review of Antispoof-

(56) References Cited

OTHER PUBLICATIONS ing Techniques", International Journal of Navigation and Observation vol. 2012, Article ID 127072, Feb. 2012.
Wullems, C., "A Spoofing Detection Method for Civilian L1 GPS and the E1-B Galileo Safety of Life Service". IEEE Transactions on Aerospace and Electronic Systems, Aug. 2011.
Wen, H., Huang, P. Y., Dyer, J., Archinal, A., Fagan, J., "Countermeasures for GPS Signal Spoofing," Proceedings of the 18th International Technical Meeting of the Satellite Division of the Institute of Navigation (ION GNSS 2005), Long Beach, CA, Sep. 2005, pp. 1285-1290.
Gurtner, W., Estey, L., "Rinex: The Receiver Independent Exchange Format Version 3.00", Nov. 28, 2007.
Gurtner, W., "Rinex: The Receiver Independent Exchange Format Version 2", Sep. 2008.
Shepard, D., Humphreys, T., Fansler, A., "Evaluation of the Vulnerability of Phasor Measurement Units to GPS Spoofing Attacks", Oct. 2, 2011.
Zhou et al., Adaptive Correction Method for an OCXO and Investigation of Analytic Cumulative Time Error Upper Bound, Jan. 2011, IEEE Transactions on Ultrasonics, Ferroelectrics, and Frequency Control, vol. 58, No. 1, pp. 43-50.
PCT/US2019/054035 Patent Cooperation Treaty, International Search Report and Written Opinion of the International Searching Authority, dated Jan. 2, 2019.
PCT/US2013/056842 Patent Cooperation Treaty, International Search Report and Written Opinion of the International Searching Authority, dated Sep. 19, 2013.
Junho Hong, Chen-Ching Liu, Manimaran Govindarasu, "Detection of Cyber Intrusions Using Network-Based Multicast Messages for Substation Automation" IEEE 2014.

\* cited by examiner

_DETECTING AND DETERRING NETWORK ATTACKS_

DETECTING AND DETERRING NETWORK ATTACKS

TECHNICAL FIELD

This disclosure relates to detecting and deterring network attacks. More specifically, but not exclusively, the present disclosure pertains to detecting and deterring man-in-the-middle ("MITM") attacks in operational technology networks.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1A:
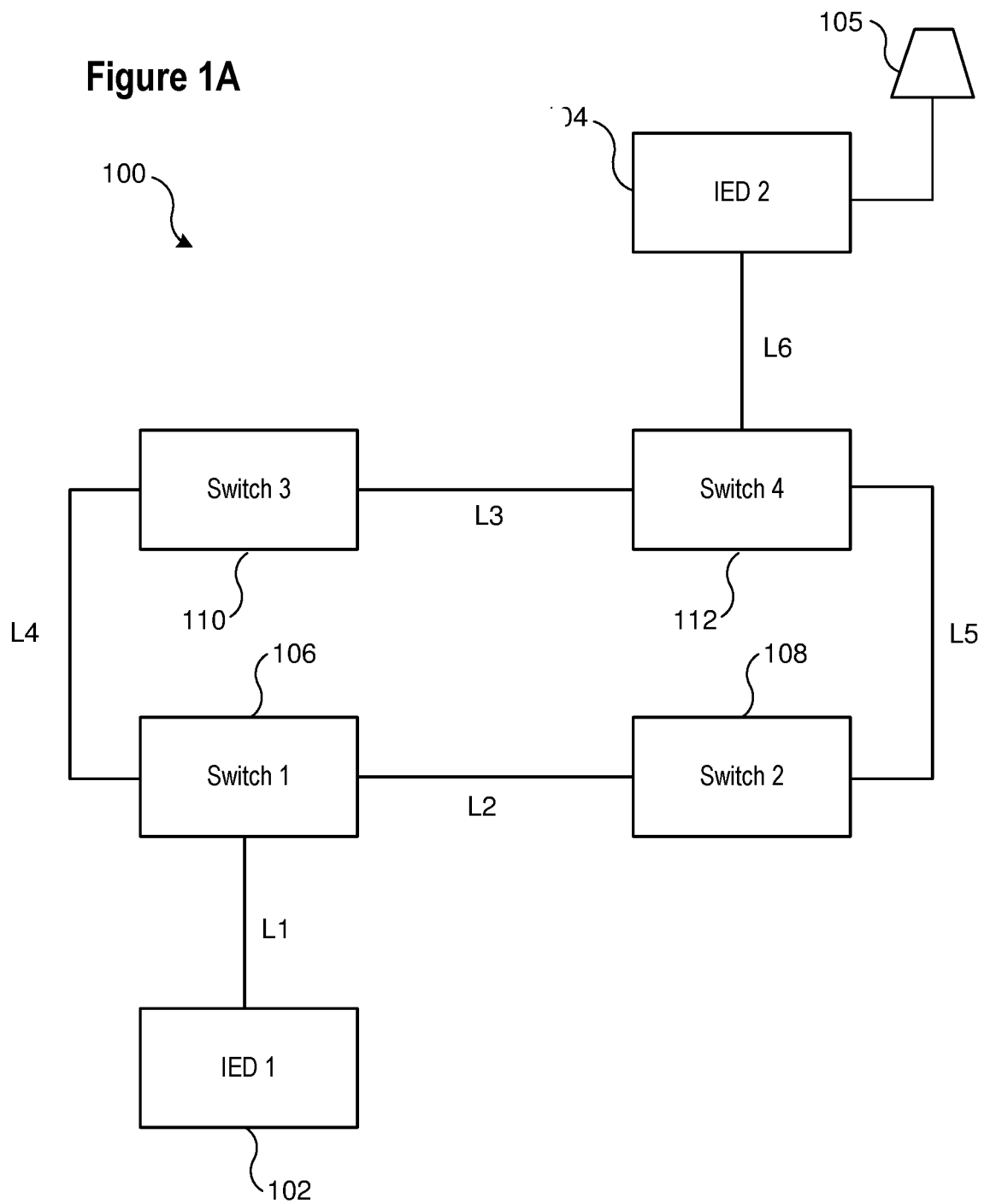
FIG. 1A illustrates a block diagram of a system including a first intelligent electronic device ("IED") and a second IED in communication through a network comprising a plurality of switches consistent with embodiments of the present disclosure.

The present disclosure pertains to detecting and deterring a variety of attacks based on a time of flight and/or a number of hopes of data packets traversing a data network. Certain embodiments may be directed to operational technology networks associated with critical infrastructure. Such networks may be vulnerable to attack because infrastructure elements are commonly disbursed over large geographic areas, remain in service for extended periods of time, and are not continuously monitored for both practical and economic reasons.

Data networks may include a variety of elements, such as data-producing elements, data-consuming elements, or data-routing elements. Data-producing elements may include components such as such as sensors, monitors, or other components that produce information to be transmitted via a network. Some data-producing devices may create machine-generated data, while other data-producing devices may also include human-generated data. Data-consuming devices may receive and act on data and may include components such as control systems, monitors, and human-machine interfaces. Networks may also include a variety of elements that route or manage network traffic, such as switches, routers, firewalls, and the like.

Network elements consistent with the present disclosure may be synchronized using a high-precision time source. A network may monitor the time of flight of packets traversing various network segments and may determine an expected time of flight for each such segment. The high-precision time source may be used to determine the time of flight, thus providing a high-precision measurement of the time of flight. In various embodiments, the high-precision time source may be selected to provide an accuracy on the order of nanoseconds.

The time of flight of data packets may be compared to an expected time of flight for one or more network segments to determine if the communication channel has been altered by an attack. In some embodiments, individual network segments may be analyzed; while in other embodiments, an overall time of flight between two communicating network elements, which may be connected using multiple network elements, may be analyzed. Where the time of flight deviates from an expected value (e.g., the time of flight is longer than the expected value), the deviation may be attributable to an attack.

Upon detection of an attack, various embodiments may implement protective actions to stop the attack. Such actions may include deactivating a compromised network segment, rerouting traffic around a comprised network segment, alerting an operator, etc.

Certain embodiments consistent with the present disclosure may be effective in detecting and deterring MITM attacks. In a MITM attack an attacker secretly relays and possibly alters the communication between two parties who believe they are directly communicating with each other. A successful MITM attack on relies on the "man in the middle" remaining undetected. A MITM attack may be detected by monitoring a communication channel to determine whether the communication channel has been altered. A deviation between the expected time of flight and the actual time of flight may provide an indication that the packets have been rerouted in connection with a MITM attack. Various network elements may continuously or periodically monitor the time of flight between network elements to detect a MITM attack.

In some embodiments, attacks affecting network time elements may also be detected and deterred using the time of flight of network packets. Some networks may include multiple time sources used to synchronize activities of elements within the network. An attacker may manipulate one or more of the time sources. Such manipulation may affect the time of flight of data packets originating from or passing through impacted nodes.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations.

Several aspects of the embodiments described will be illustrated as software modules or components. As used herein, a software module or component may include any type of computer instruction or computer-executable code located within a memory device and/or transmitted as electronic signals over a system bus or wired or wireless network. A software module or component may, for instance, comprise one or more physical or logical blocks of computer instructions which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media or machine-readable media, suitable for storing electronic instructions.

FIG. 1A illustrates a block diagram of a system 100 including a first IED 102 and a second IED 104 in communication through a network comprising a plurality of switches 106-112 consistent with embodiments of the present disclosure. As used herein, an IED (such as IEDs 102 and 104) may refer to any microprocessor-based device that performs functions within system 100. Such devices may monitor, control, automate, and/or protect equipment within system 100. Further, IEDs (such as IEDs 102 and 104) may consume information from other IEDs for purposes of displaying such information to users, generating alerts, and other forms of human interaction. IEDs (such as IEDs 102 and 104) may include, but are not limited to, computing platforms, programmable logic controllers (PLCs), programmable automation controllers, communications processors, input and output modules, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, and the like. The term IED may be used to describe an individual IED or a system comprising multiple IEDs.

The devices in system 100 may be synchronized using a high-precision time source. Some examples of high-precision time sources include a Global Navigational Satellite System (GNSS), such as the Global Positioning System (GPS), GLONAS, and Galileo systems. A high-precision time signal may be delivered using various technologies, including IRIG, a WWVB or WWV, a network-based system such as the IEEE 1588 precision time protocol, and the like. According to one embodiment, a high-precision time source may comprise a GNSS-synchronized clock (e.g., Model No. SEL-2407, available from Schweitzer Engineering Laboratories, Inc., of Pullman, Wash.). In the illustrated embodiment, IED 104 includes a GPS receiver 105 to receive a time signal from a GNSS. The time signal may be distributed to other components of system 100 using IEEE 1588 precision time protocol. A source or transmitter of a data packet may determine the time that the packet is put on the wire, which may be referred to as TS or "Time Sent." In certain embodiments, jumbo frames may be utilized to accommodate an eight-byte time stamp. In one embodiment, each packet may be published with either a 64-bit time stamp at a pre-defined packet offset into the data field or a 64-bit time stamp at the end of the packet. In some embodiments, a time stamp may be appended to the end of a packet similar to a prp tag, or perhaps part of a prp tag modification. In yet other embodiments, a valid time of flight is determined based on a time of flight of a plurality of data packets transmitted during a configuration process.

A receiving device may time stamp a packet upon receipt, which may be referred to as TR, or "Time Received." A receiving device may then calculate a time of flight using Eq. 1.

$$\text{Time of Flight} = \text{Time Received} - \text{Time Sent} \quad \text{Eq. 1}$$

A typical or expected time of flight value may be determined and stored. In various embodiments, the typical or expected time of flight may be determined using various techniques. For example, the typical or expected time of flight may be determined during commissioning by calculating an average time of flight for a plurality of packets.

In operation, the security of data packets in system 100 may be verified for a variety of network technologies, devices, and topologies. The number of network hops for each client-server connection may be determined for each possible path, along with a time of flight for each link in each possible path. In the illustrated embodiment, IED 102 may exchange information with IED 104 over two possible paths. The primary path comprises L1, L4, L3, and L6, and the backup path comprises L1, L2, L5, and L6. The primary path and the backup path will each have a fixed time of travel based on the time of flight of each link, L1-L6, which may be represented as T1-T6, respectively. Accordingly, the time of flight for a packet to travel from IED 102 to IED 104 is expressed by either Eq. 2 or Eq. 3.

$$T' = T1 + T2 + T5 + T6 \quad \text{Eq. 2}$$

OR $$T'' = T1 + T4 + T3 + T6 \quad \text{Eq. 3}$$

Packets that do not correspond to either T' or T" may be identified and/or flagged. Further, the primary path and the backup path have a fixed number of hops. Packets with a number of hops that differs from the fixed number corresponding to the primary path and the backup path may also be flagged. In the illustrated example, two paths are illustrated (i.e., the primary path and the backup path), but it will be appreciated that any number of paths may exist in various embodiments.

Figure 1B:
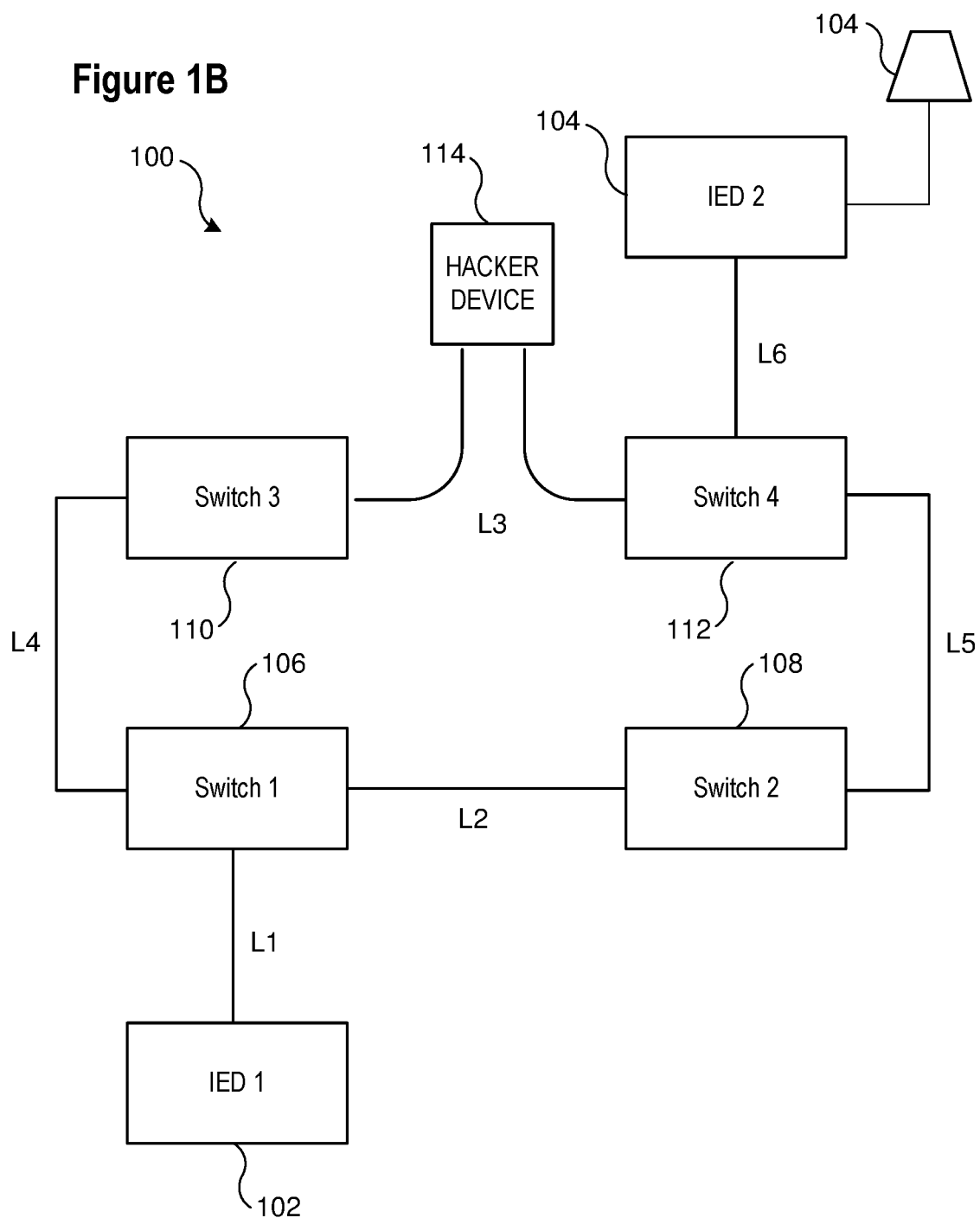
FIG. 1B illustrates the system of FIG. 1A in which a hacker has intercepted communications between two switches consistent with embodiments of the present disclosure.

FIG. 1B illustrates the system 100 of FIG. 1A in which a hacker has intercepted communications between two switches 110, 112 consistent with embodiments of the present disclosure. As illustrated, the hacker device 114 is disposed between switch 110 and switch 112. As such, the hacker device 114 may receive and relay communications between switch 110 and switch 112 to avoid detection. The addition of the hacker device 114 adds to the time of flight of a network packet passing between the switches 110, 112. As such, systems and methods consistent with the present disclosure may detect hacker device 114.

If a new switch is added in line with an existing path in order to add a network port to connect a hacker device 114, the packets will not travel the same primary path. Packets will now travel through the new cable and switch and this technology will detect that new path due to the change in the time of flight. In certain embodiments, each packet may include a header comprising transit time value and the number of hops taken to reach the destination.

Where a time of flight exceeds an expected time of flight, certain actions may be taken to reconfigure system 100 to reduce the risk associated with a potential MITM attack. For example, if data packets between IED 102 and IED 104 are routed through the path comprising L1, L4, L3 (i.e., through the hacker device 114), and L6, system 100 may reroute the data packets using the path comprising L1, L2, L5, and L6. The rerouted packets may thereby avoid hacker device 114. In another example, system 100 may create an isolated path to create a honeypot to navigate a hacker to a trap.

Embodiments consistent with the present disclosure may comprise deterministic and non-deterministic networks. In deterministic networks, such as software-defined networks (SDN), the path of a packet through a network is defined. As such, the time of flight should have a predictable time of flight. In embodiments incorporating SDN elements, traffic may be rerouted to alternate flows in response to a determination that the time of flight of one or more data packets is inconsistent with a valid time of flight.

In non-deterministic networks, a time of flight may be determined for a primary path. Changes in the network (e.g., failure of a network link) or changes in network conditions (e.g., network congestion) may result in changes to routing of data. Alternate paths may be determined using protocols, such as spanning tree protocol (STP) and rapid spanning tree protocol (RSTP), in response to changes in the network. Identifying an alternate path may result in a longer time of flight. Accordingly, an indication that a time of flight exceeds a threshold may indicate that the packet traversed an alternate path. Packets exhibiting a time of flight that exceeds a threshold may also result from injection of a packet by a rogue device on a rogue connection. An operator may review packets flagged with a longer-than-expected time of flight and determine whether the additional time was the result of routing through an alternate path or a MITM attack.

Certain embodiments may also utilize a hash value to verify that packets were not modified in transit. In one specific embodiment, the hash value may be determined using an identifier of the source and the data to be transmitted. The recipient may previously have received or have been configured with the identifier of the source, and as such, the hash value may allow for verification of both the data and the source.

Figure 2:
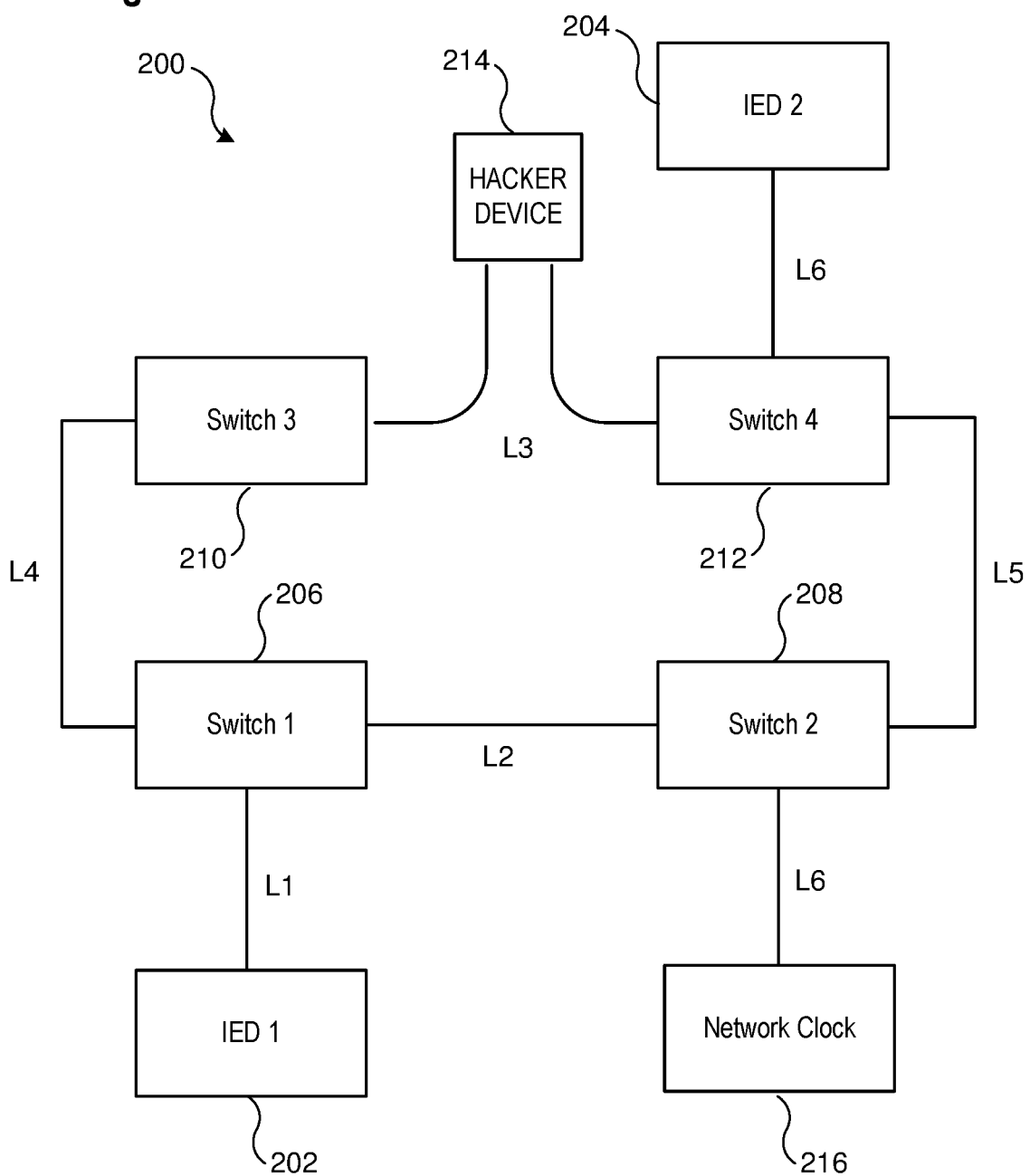
FIG. 2 illustrates a block diagram of a system in which a plurality of network devices may be configured to determine a time of flight consistent with embodiments of the present disclosure.

FIG. 2 illustrates a block diagram of a system 200 in which a plurality of network devices may be configured to determine a time of flight consistent with embodiments of the present disclosure. System 200 may implement time of flight determinations consistent with the present disclosure at the network level, rather than being implemented directly by communicating devices. For example, switches 206-212 may receive a time signal from network clock 216 and may apply time stamps to packets transmitted by IEDs 202 and 204. The switches may further determine a time of flight associated with such packets and determine whether the time of flight corresponds to an expected value. Such embodiments may be utilized to provide additional security to existing systems and devices and may be added during an update of network equipment.

Network clock 216 may comprise an authorized client list that may be used to identify devices authorized to connect to network clock 216. In various embodiments, the list may comprise a media access control (MAC) address, serial number, IP address, or other identifier. Devices on the authorized client list, such as IEDs 202 and 204, may receive a time signal based on network clock 216 and may use the time signal from network clock 216 to determine the time of flight of network packets. The time of flight of a particular packet may be determined based on a time stamp included with each packet.

Switches 206-212 may add time stamps to packets from authorized sources, such as IED 202 and 204. In various embodiments, the time stamps may be added at precision time protocol tags or may be inserted into a data packet header. Further, switches 206-212 may determine a time of flight associated with data packets in system 200. Packets missing a time stamp may be flagged as originating from an unauthorized source.

In the illustrated embodiment, packets from hacker device 214 may be identified due to a lack of a time stamp based on network clock 216. Even if hacker device 214 is capable of adding a time stamp, the time stamp may differ from that of network clock 216. Still further, even assuming that network clock 216 and hacker device 214 both rely on a common time source (e.g., a GPS time signal), the time of flight will differ due to the delay associated with relaying packets from switch 210 and switch 212.

Figure 3:
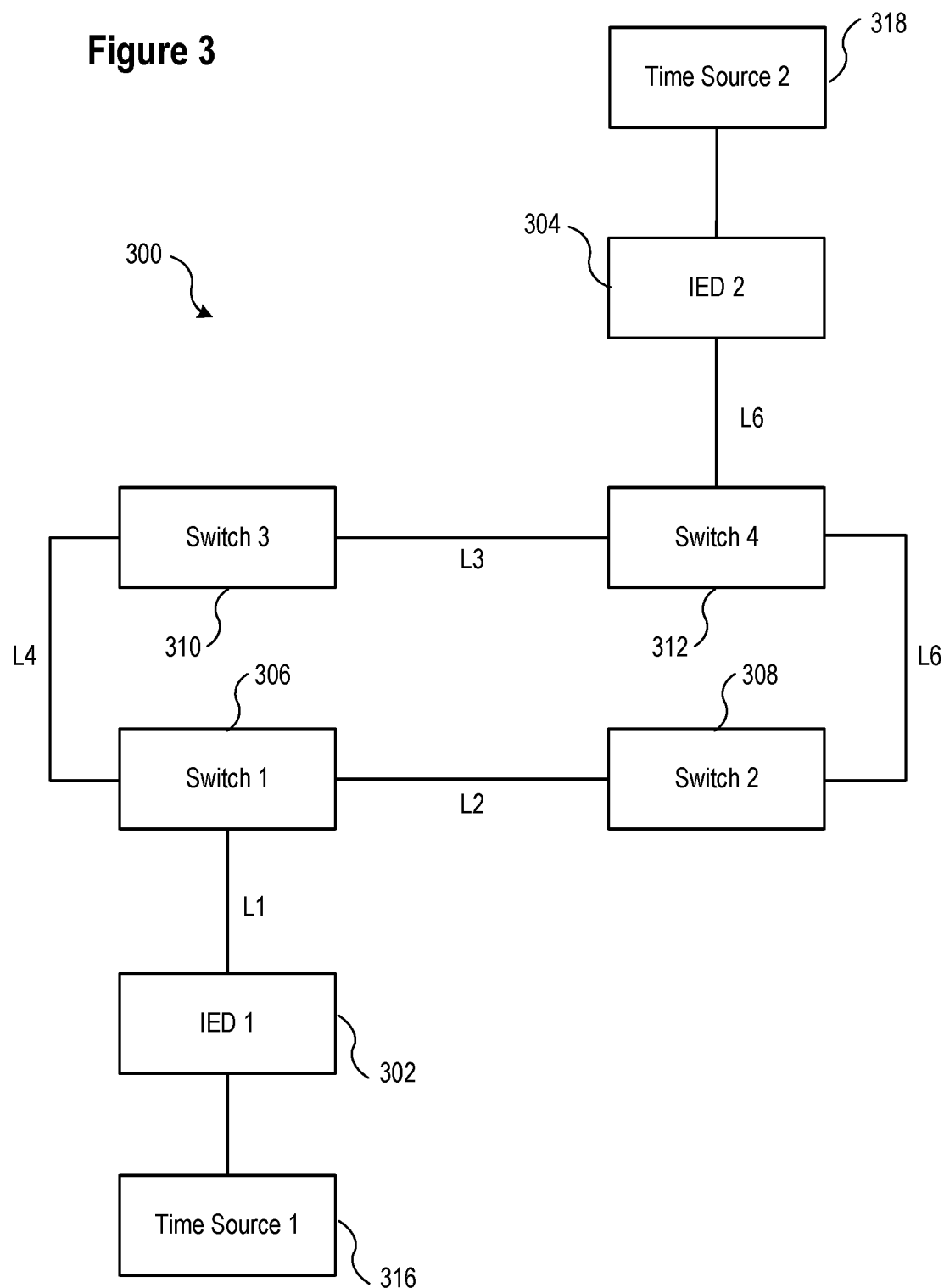
FIG. 3 illustrates a system comprising a first time source in communication with a first IED and a second time source in communication with a second IED consistent with embodiments of the present disclosure.

FIG. 3 illustrates a system 300 comprising a first time source 316 in communication with a first IED 302 and a second time source 318 in communication with a second IED 304 consistent with embodiments of the present disclosure. In the illustrated embodiment, IED 302 may time stamp data packets based on a time signal from time source 316, while IED 304 may time stamp data packets based on a time signal from time source 318.

An attack on system 300 may include manipulation of time source 316. Packets from IED 302 may include a time stamp that reflects the manipulation of time source 316. IED 304 may receive packets from IED 302 that include time stamps reflecting the manipulated time source 316.

A change to time source 316 causes the data packets transmitted by IED 302 to be tagged with the corresponding time. When data packets transmitted by IED 302 are received by IED 304, the manipulation of time source 316 may be reflected in the associated time of flight. Accordingly, system 300 may flag the packets and the manipulation of time source 316 may be detected.

Figure 4:
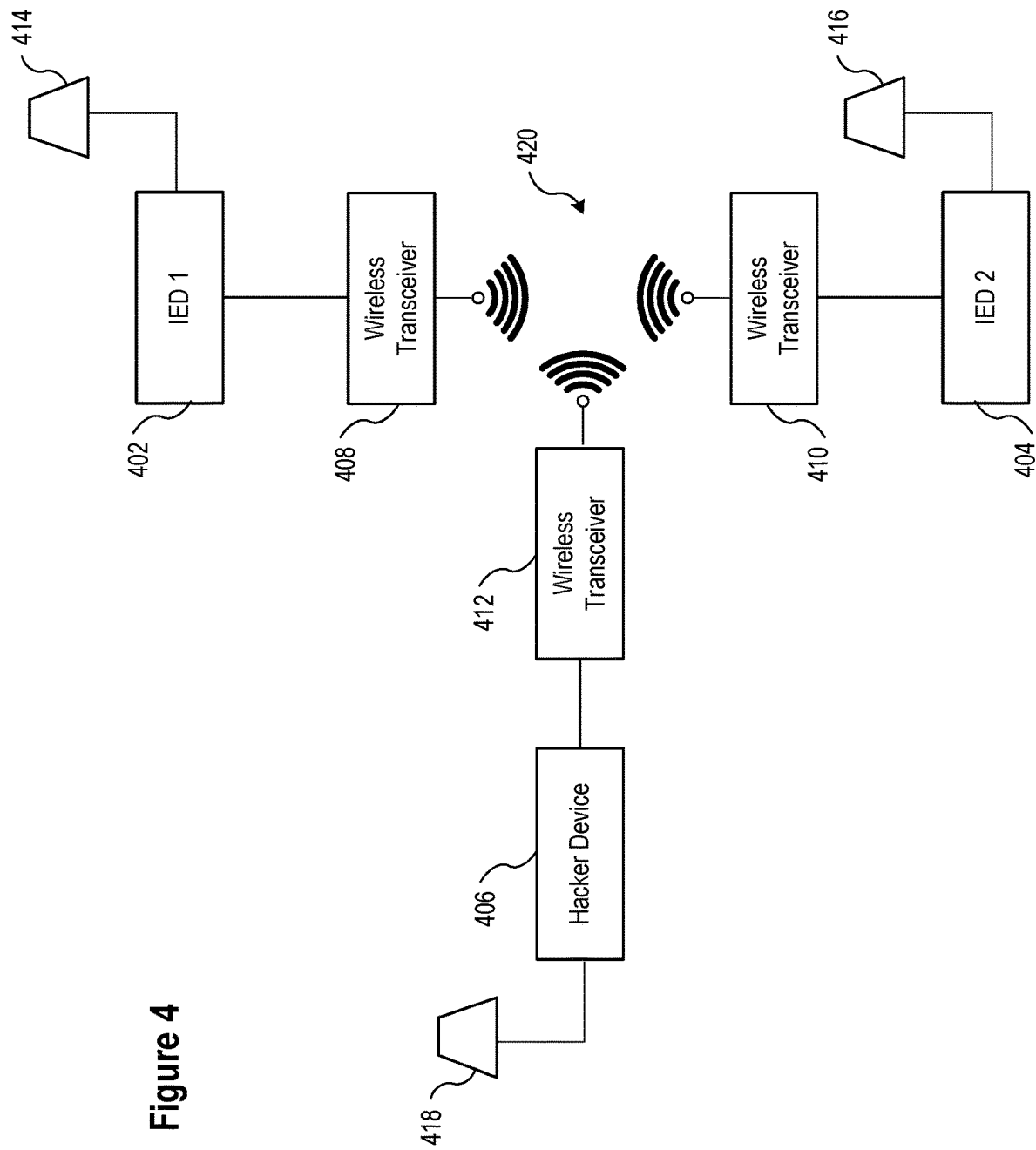
FIG. 4 illustrates a block diagram of a MITM attack in a system comprising a wireless communication channel consistent with the present disclosure.

FIG. 4 illustrates a block diagram of a MITM attack in a system 400 comprising a wireless communication channel consistent with the present disclosure. In the illustrated embodiment, IEDs 402 and 404 are in communication with wireless transceivers 408 and 410, respectively. Wireless transceivers 408 and 410 may utilize a variety of communication technologies (e.g., radio transceivers, microwave transceivers, etc.) and communication protocols. Such technologies may permit communication across widely varying distances, ranging from relatively short distances to long distances. Wireless transceivers 408 and 410 allow IEDs 402 and 404 to communicate through a wireless communication channel 420.

IEDs 402 and 404 may each comprise GNSS receivers 414 and 416 and may use a time signal from a GNSS to time stamp data packets. IEDs 402 and 404 may calculate a time of flight for data packets based on the time stamps associated with the data packets. Data packets with a time of flight that differs from an expected value may be flagged.

A hacker device 406 also comprises a GNSS receiver 418 to receive the time signal from the GNSS and a wireless transceiver 412 to communicate through wireless communication channel 420. Hacker device 406 may interfere with communications between IEDs 402 and 404 using various techniques. For example, hacker device 406 may attempt to jam communications through wireless communication channel 420. While jamming communication channel 420, hacker device 406 may implement a MITM attack by relaying communications between IED 402 and 404.

The MITM attack implemented by hacker device 406 may be detected based on the time of flight associated with packets transmitted via communication channel 420. For example, a data packet transmitted from IED 402, intercepted by hacker device 406, and relayed to IED 404 may exhibit a time of flight that exceeds an expected value based on the delay associated with receiving, processing, and relaying the message by hacker device 406.

Figure 5:
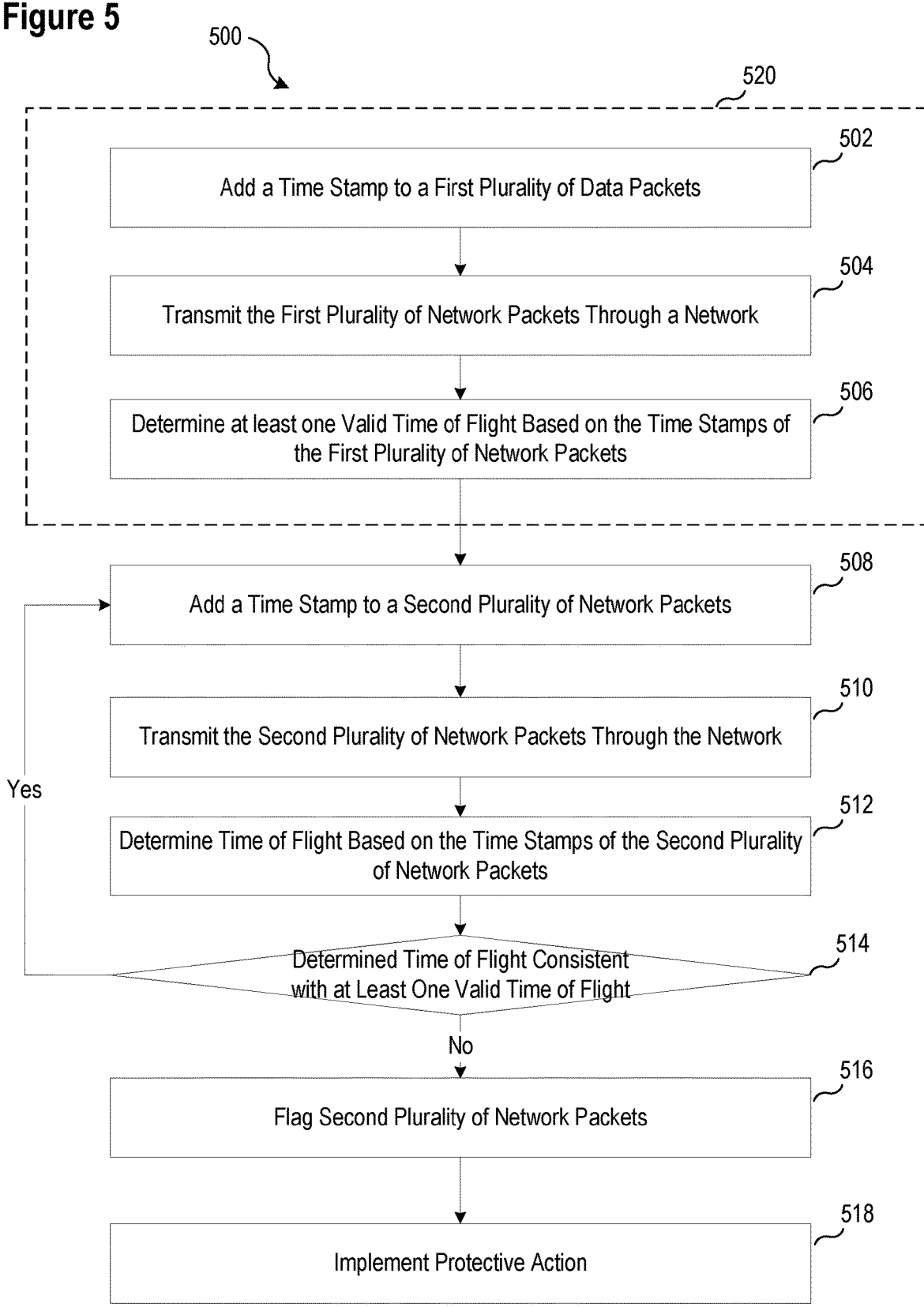
FIG. 5 illustrates a flow chart of a method for detecting and deterring network attacks consistent with embodiments of the present disclosure.

FIG. 5 illustrates a flow chart of a method 500 for detecting and deterring network attacks consistent with embodiments of the present disclosure. At 502, a time stamp may be added to a first plurality of network packets. In various embodiments, the time stamp may be added to the plurality of network packets by a device that produced the plurality of data packets or may be added by a network device that receives the plurality of data packets. The time stamp may be derived from a high-precision time source that provides nanosecond accuracy, such as a GNSS.

At 504, the first plurality of data packets may be transmitted through a network. The network may comprise a wired or wireless communication channel, and a variety of types of network technologies, topologies, and communication protocols may be utilized.

At 506, at least one valid time of flight may be determined based on the time stamps of the plurality of network packets. In certain embodiments, multiple valid times of flight may exist. For example, as discussed in connection with FIG. 1, two valid times of flight exist and are specified in Eq. 2 and Eq. 3. Still further, certain embodiments may include highly redundant networks, and as such, may include multiple valid times of flight.

Elements 502, 504, and 506 may comprise a configuration process 520. In some embodiments, the configuration process 520 may be performed upon commissioning of a system. Further, the configuration process 520 may be performed according to a schedule or based on conditions in a network. Periodically performing configuration process 520 may allow a system implementing method 500 to adapt to changing conditions.

At 508, a time stamp may be added to a second plurality of network packets, and the second plurality of network packets may be transmitted at 510. A time of flight may be determined based on the time stamps of the second plurality of network packets at 512.

At 514, method 500 may determine whether the time of flight of the second plurality of network packets is consistent with the at least one valid time of flight. If the time of flight is consistent with the at least one valid time of flight, it may be concluded that the network packets were not intercepted or manipulated in transit.

If the time of flight is not consistent with the determined time of flight of the second plurality of data packets at 514, the packets may be flagged at 516. In various embodiments, the flagged packets may be reviewed to determine the reason that the time of flight differs from an expected value. For example, the additional time of flight may be associated with a communication link failure and discovery of a new path using a self-healing protocol, such as STP or RSTP. Alternatively, the deviation of the time of flight from the at least one valid time of flight may be caused by a MITM attack and the delay associated with a hacker's device relaying the second plurality of network packets.

At 518, a protective action may be implemented. In one embodiment, data packets may be re-routed through an alternative path. As discussed above in connection with FIG. 1B, data packets may be re-routed to avoid network segment L3, and thus avoid the hacker device 114. Still further, in one embodiment, a system may create an isolated path to create a honeypot to navigate a hacker to a trap.

Figure 6:
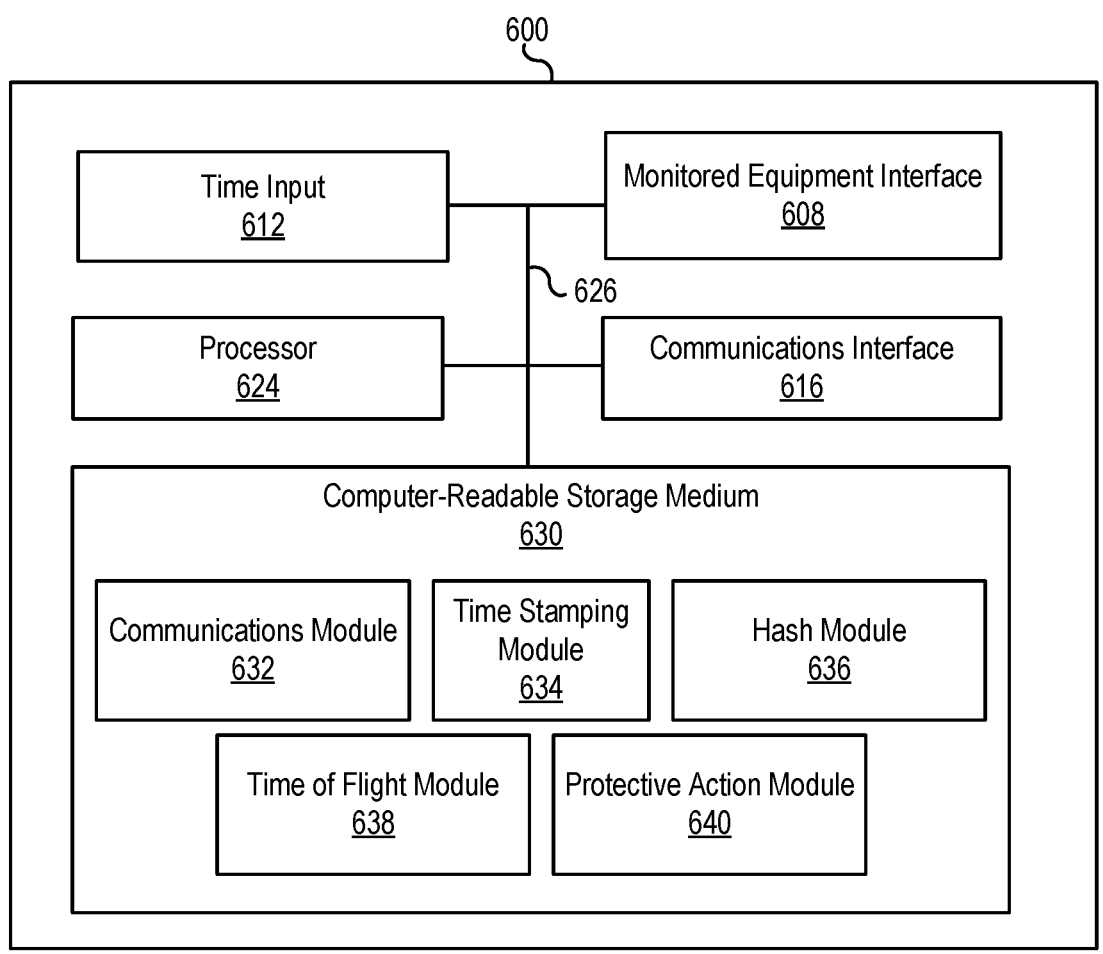
FIG. 6 illustrates a block diagram of a system to determine a time of flight of a plurality of network packets consistent with embodiments of the present disclosure.

FIG. 6 illustrates a block diagram of a system 600 to determine a time of flight of a plurality of network packets consistent with embodiments of the present disclosure. In certain embodiments, system 600 may comprise an IED and/or a network device to route data packets in a network. System 600 may be implemented using hardware, software, firmware, and/or any combination thereof. Moreover, certain components or functions described herein may be associated with other devices or performed by other devices. The specifically illustrated configuration is merely representative of one embodiment consistent with the present disclosure.

System 600 includes a communications interface 616 configured to communicate with other devices. In certain embodiments, the communications interface 616 may facilitate direct communication with another IED or communicate with another IED over a communications network. Communications interface 616 may facilitate communications with multiple IEDs.

System 600 may further include a time input 612, which may be used to receive a time signal (e.g., a common time reference) allowing system 600 to apply a time-stamp to the acquired samples. In certain embodiments, a common time reference may be received via communications interface 616, and accordingly, a separate time input may not be required for time-stamping and/or synchronization operations. One such embodiment may employ the IEEE 1588 protocol. A monitored equipment interface 608 may be configured to receive status information from, and issue control instructions to, a piece of monitored equipment.

Processor 624 may be configured to process communications received via communications interface 616, time input 612, and/or monitored equipment interface 608. Processor 624 may operate using any number of processing rates and architectures. Processor 624 may be configured to perform various algorithms and calculations described herein. Processor 624 may be embodied as a general-purpose integrated circuit, an application-specific integrated circuit, a field-programmable gate array, and/or any other suitable programmable logic device.

A computer-readable storage medium 630 may be the repository of various software modules configured to perform any of the methods described herein. A data bus 626 may link monitored equipment interface 608, time input 612, communications interface 616, and computer-readable storage medium 630 to processor 624.

A communications module 632 may allow system 600 to communicate with any of a variety of external devices via communications interface 616. Communications module 532 may be configured for communication using a variety of data communication protocols (e.g., Ethernet, IEC 61850, etc.).

A time stamping module 634 may be configured to apply a time stamp to communications transmitted by system 600. Time stamping module 634 may receive a time signal from time input 612 and may base the time stamp on the time signal. Although illustrated as a software module in FIG. 6, in other embodiments, time stamping may be performed using hardware elements.

A hash module 636 may generate a hash value that may be used to verify that packets were not modified in transit. In one specific embodiment, the hash value may be determined using an identifier of system 600 and the data to be transmitted. A device in communication with 600 may have previously received or have been configured with the identifier associated with system 600, and as such, the hash value may allow for verification of both the data and the source.

A time of flight module 638 may be configured to determine at least one valid time of flight associated with a plurality of data packets. A valid time of flight may be determined in various embodiments during a configuration process, such as configuration process 520, illustrated in FIG. 5. Further, time of flight module 638 may assess the time of flight associated with packets received by system 600 and may determine whether the time of flight is consistent with at least one valid time of flight. Where the time of flight is determined to be inconsistent with at least one valid time of flight, associated data packets may be flagged for additional review.

A protective action module 640 may implement a protective action based on a determination that one or more data packets are inconsistent with a valid time of flight. In some embodiments, the protective action may include rerouting traffic in the network, selectively discarding flagged packets, and creating a honeypot to navigate a hacker to a trap.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system to detect a network attack, comprising:
a first device, comprising:
a first processor;
a first non-transitory computer-readable medium to store a plurality of modules comprising instructions executable by the first processor;
a first time input in communication with a high-precision time source;
a first time stamping module in communication with the first time input to associate a first time stamp with each of a first plurality of data packets, the first time stamp corresponding to a time that each data packet is transmitted by the first device according to the high-precision time source; and
a network interface to transmit the first plurality of data packets through a data network;
a second device, comprising:
a second processor;
a second non-transitory computer-readable medium to store a plurality of modules comprising instructions executable by the second processor;
a second time input in communication with the high-precision time source;
a second time stamping module in communication with the second time input to associate a second time stamp with each of the first plurality of data packets, the second time stamp corresponding to a time that each data packet is received by the second device according to the high-precision time source;
a time of flight subsystem module to:
determine a time of flight for each of the first plurality of data packets based on the first time stamp and the second time stamp; and
determine whether the time of flight for each of the first plurality of data packets is consistent with at least one valid time of flight; and
a protective action subsystem module to implement a protective action based on a determination that the time of flight of at least one of the first plurality of data packets is inconsistent with the at least one valid time of flight;
wherein the protective action comprises detecting that the first time input is compromised based on the determination that the time of flight of at least one of the first plurality of data packets is inconsistent with the at least one valid time of flight and selectively rerouting at least one of the first plurality of data packets.

2. The system of claim 1, wherein the network comprises a software defined network and selectively rerouting at least one of the first plurality of data packets comprises a change to a data flow to reroute a data flow.

3. The system of claim 1, wherein the protective action comprises flagging at least one of the first plurality of data packets that is inconsistent with the at least one valid time of flight for operator review.

4. The system of claim 1, wherein the first device further comprises a hash subsystem to generate a hash value and to associate the hash value with each of the first plurality of data packets.

5. The system of claim 4, wherein the hash value is generated based on an identifier of the first device and a data value in each of the first plurality of data packets.

6. The system of claim 1, wherein the high-precision time source comprises a global navigation satellite system (GNSS) and each of the first time input and the second time input are in communication with a GNSS receiver.

7. The system of claim 1, wherein each of the first device and the second device comprise a network switch.

8. The system of claim 1, wherein each of the first device and the second device comprise an intelligent electronic device.

9. The system of claim 1, wherein the at least one valid time of flight is determined based on a time of flight of a second plurality of data packets transmitted during a configuration process.

10. The system of claim 1, wherein the first time stamp is appended to each data packet using one of a precision time protocol tag and an offset into a data field.

11. The system of claim 1, wherein a time of flight module is further configured to:
   determine a valid number of hops associated with the at least one valid time of flight; and
   determine whether an actual number of hops for each of the first plurality of data packets is consistent with the valid number of hops.

12. A method for detecting a network attack, comprising:
   receiving, using a first device, a high-precision time signal;
   associating, using the first device, a first time stamp with each of a first plurality of data packets, the first time stamp corresponding to a time that each data packet is transmitted by the first device according to the high-precision time source;
   transmitting, using the first device, the first plurality of data packets through a data network;
   receiving, using a second device, the high-precision time signal;
   associating, using the second device, a second time stamp with each of the first plurality of data packets, the second time stamp corresponding to a time that each data packet is received by the second device according to the high-precision time source;
   determining, using the second device, a time of flight for each of the first plurality of data packets based on difference between the first time stamp and the second time stamp;
   determining, using the second device, whether the time of flight for each of the first plurality of data packets is consistent with at least one valid time of flight;
   implementing, using the second device, a protective action based on a determination that the time of flight of at least one of the first plurality of data packets is inconsistent with the at least one valid time of flight; and
   wherein the protective action comprises detecting that the first time input is compromised based on the determination that the time of flight of at least one of the first plurality of data packets is inconsistent with the at least one valid time of flight and selectively rerouting at least one of the first plurality of data packets.

13. The method of claim 12, wherein selectively rerouting at least one of the first plurality of data packets comprises rerouting data packets in the network by changing a data flow in a software defined network.

14. The method of claim 12, further comprising:
   generating, using the first device, a hash value; and
   associating the hash value with each of the first plurality of data packets.

15. The method of claim 14, wherein the hash value is generated based on an identifier of the first device and a data value in each of the first plurality of data packets.

16. The method of claim 12, wherein each of the first device and the second device comprise a network switch.

17. The method of claim 12, wherein each of the first device and the second device comprise an intelligent electronic device.

18. The method of claim 12, further comprising:
   determining the at least one valid time of flight based on a time of flight of a second plurality of data packets transmitted during a configuration process.

19. A system to detect a network attack, comprising:
   a first device, comprising:
      a first processor;
      a first non-transitory computer-readable medium to store a plurality of modules comprising instructions executable by the first processor;
      a first time input in communication with a high-precision time source;
      a first time stamping module in communication with the first time input to associate a first time stamp with each of a first plurality of data packets, the first time stamp corresponding to a time that each data packet is transmitted by the first device according to the high-precision time source; and
      a network interface to transmit the first plurality of data packets through a data network;
   a second device, comprising:
      a second processor;
      a second non-transitory computer-readable medium to store a plurality of modules comprising instructions executable by the second processor;
      a second time input in communication with the high-precision time source;
      a second time stamping module in communication with the second time input to associate a second time stamp with each of the first plurality of data packets, the second time stamp corresponding to a time that each data packet is received by the second device according to the high-precision time source;
      a time of flight module to:
         determine a time of flight for each of the first plurality of data packets based on the first time stamp and the second time stamp; and
         determine whether the time of flight for each of the first plurality of data packets is consistent with at least one valid time of flight; and
      a protective action module to implement a protective action based on a determination that the time of flight of at least one of the first plurality of data packets is inconsistent with the at least one valid time of flight;
      wherein the protective action comprises detecting that the first time input is compromised based on the determination that the time of flight of at least one of the first plurality of data packets is inconsistent with the at least one valid time of flight and selectively discard at least one of the first plurality of data packets.

* * * * *